United States Patent [19]
Kersten et al.

[11] Patent Number: 5,745,614
[45] Date of Patent: Apr. 28, 1998

[54] OPTICAL MODE FILTER

[75] Inventors: Peter Kersten, Weissach; Johannes Koppenborg, Sersheim, both of Germany; Jaakko Aarnio, Espoo, Finland

[73] Assignee: Alcatel N.V., Rijswijk, Netherlands

[21] Appl. No.: 715,416

[22] Filed: Sep. 18, 1996

[30] Foreign Application Priority Data

Sep. 26, 1995 [DE] Germany ............... 195 35 685.3

[51] Int. Cl.$^6$ ..................................... G02B 6/14
[52] U.S. Cl. ............................. 385/29; 385/129
[58] Field of Search ............... 385/27–30, 129–132

[56] References Cited

U.S. PATENT DOCUMENTS

| | | | |
|---|---|---|---|
| 4,019,051 | 4/1977 | Miller | 250/227.24 |
| 4,712,855 | 12/1987 | Tolksdorf et al. | 385/129 |
| 4,869,567 | 9/1989 | Millar et al. | 385/27 |
| 5,080,506 | 1/1992 | Campbell et al. | 385/29 |
| 5,093,884 | 3/1992 | Gidon et al. | 385/132 |

FOREIGN PATENT DOCUMENTS

| | | |
|---|---|---|
| 26 57 595 | 7/1977 | Germany. |
| 2657595 | 7/1977 | Germany. |
| 35 14 413 | 10/1986 | Germany. |
| 3514413 A1 | 10/1986 | Germany. |

OTHER PUBLICATIONS

IEEE Photonics Technology Letters, Bd. 8, Nr. 7, Jul. 1996, New York, U.S., Seiten 909–911, XP000595618, G. Neumann et al., "A New Integrated Optical–Mode Stripper Configuration: Numerical Analysis and Design".

Patent Abstracts of Japan, Publ. No. JP59160106, Sep. 1984.

*Primary Examiner*—John D. Lee
*Attorney, Agent, or Firm*—Frishauf, Holtz, Goodman, Langer & Chick

[57] ABSTRACT

An optical mode filter, that is, an optical component in which the basic mode can propagate undamped as much as possible but which in higher modes are strongly damped. The optical mode filter, is an integrated optical wave guide formed by, a higher-refracting or an absorbent material disposed near a flat wave guide core. Two buffer layers are located opposite the wave guide core, and one is formed with a thinned region to function as a filter for higher modes being transmitted through the wave guide core.

3 Claims, 2 Drawing Sheets

OPTICAL MODE FILTER

FIELD OF THE INVENTION

The invention relates to a device for preventing the propagation of undesired modes in an integrated optical wave guide, in which near the medium carrying the modes, a radiation-absorbing layer is disposed that has an index of refraction which is equal to or greater than the index of refraction of the medium carrying the modes.

BACKGROUND

In integrated optical wave guides, it is known (see German Patent Disclosure DE-A 35 14 413) that the propagation of undesired modes is prevented with certainty if an intermediate layer that absorbs the radiation and whose index of refraction is slightly greater than the index of refraction of the light-carrying layer is disposed between the substrate and the light-carrying layer. The modes not desired for monomode operation are strongly damped on passing through the absorption layer.

Absorbing members are known (German Patent DE-C 26 57 595) whose task is to decouple interfering modes out of the medium carrying them and to absorb them. The optical absorbing member is disposed above the medium that carried the modes and comprises an optically absorbent material with an index of refraction that is equal to or greater than the index of refraction of the material carrying the modes.

Light-absorbing materials with embedded ions of iron, copper or cobalt are known.

SUMMARY OF THE INVENTION

The object of the invention is to provide a structure of an optical wave guide with an optical mode filter integrated therewith, which can be realized in a simple way.

Briefly, the optical wave guide is located on a flat substrate. A wave guide core is located between two buffer layers. On at least one side of the wave guide core, at least one of the buffer layers is formed with a trench-like indentation, which is filled with absorbent material. The surface of the buffer layer removed from the substrate is covered with another absorbent layer. The absorbent layer, which covers the second buffer layer, has a higher index of refraction than the buffer layers; one of the buffer layers is formed with a thin portion which functions as a filter for higher modes being transmitted through the wave guide core.

DRAWINGS

FIG. 1a, cross section through an embodiment of the mode filter taken along the section line CD in FIG. 1b, FIG. 1b, a longitudinal section through the mode filter of FIG. 1a taken along the section line AB.

DETAILED DESCRIPTION

Figure 1A:
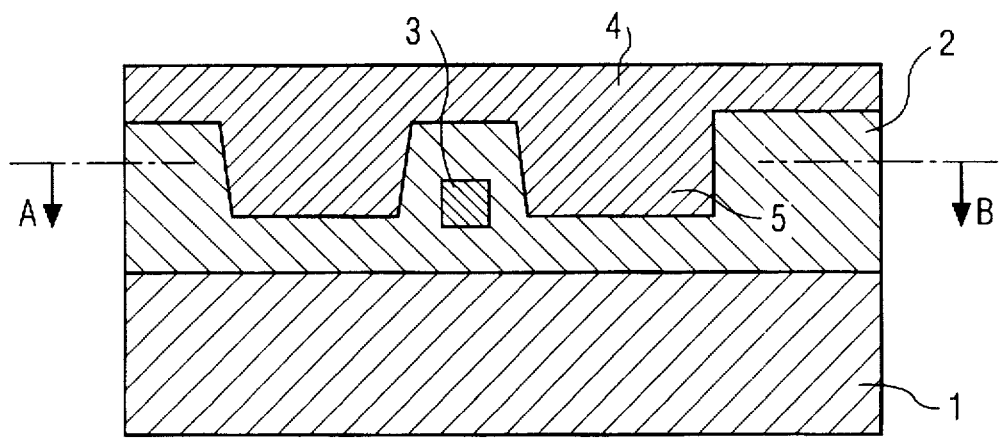
Figure 1B:
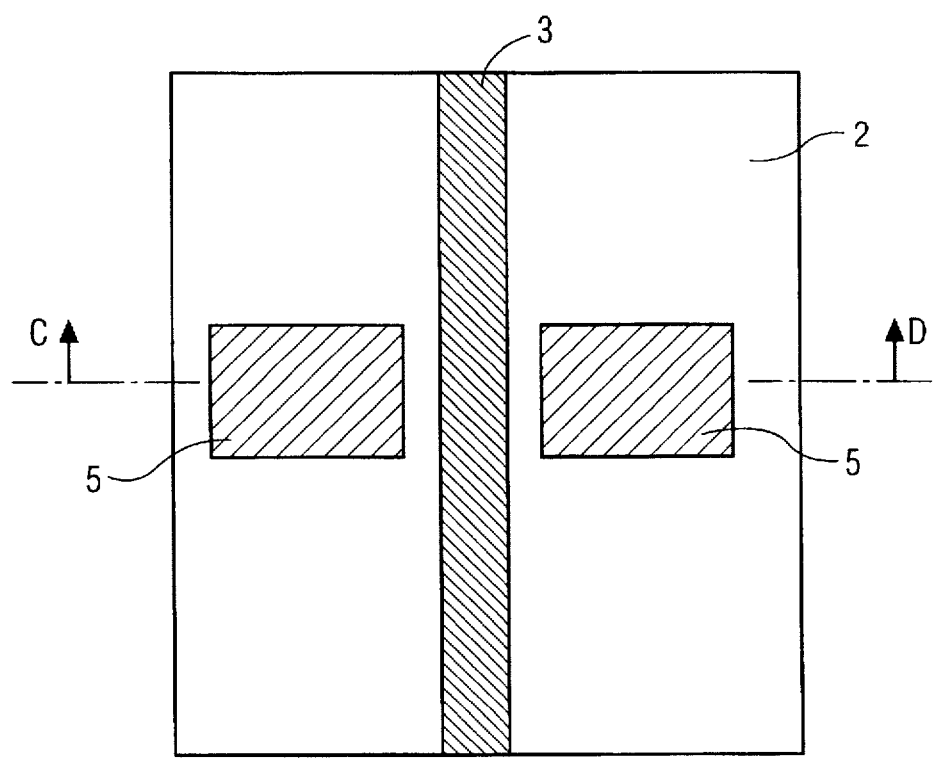

As can be seen from FIGS. 1a and 1b, the mode filter is built up on a substrate 1, for instance of silicon. The surface of the substrate 1 is provided with a buffer layer 2, for instance of silicon dioxide, in which the optical wave guide core 3 is embedded. Disposed over layer 2 is a cover layer 4 of a polymer which also fills indentations 5, that are disposed on both sides of an optical wave guide core 3. The indentations 5 have been made by etching the buffer layer 2 and are approximately 3×5 mm in size.

If the optical wave guide core 3 comprises a material, such as silicon dioxide, having an index of refraction of 1.4461, for instance, and the index of refraction of the buffer layer 2 is 1.4421, and that of the cover layer 4 is 1.5, for instance, then the damping, for the higher modes of an operating wavelength of 1300 nm, is approximately 2 dB per cm.

Figure 2:
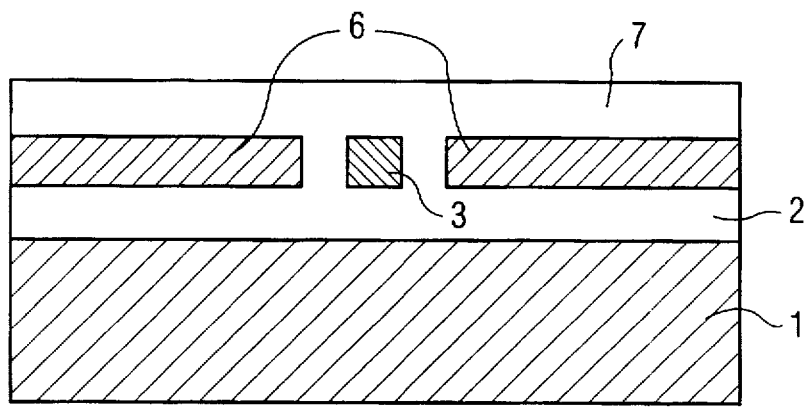
FIG. 2 is a cross section through another embodiment of a mode filter.

The embodiment of the mode filter shown in FIG. 2 likewise has a substrate 1, over which a lower buffer layer 2, a core layer 6 and an upper buffer layer 7 are arranged. In the production of the optical wave guide core, part of the core layer 6 is removed, and the remainder of the core layer 6 is preserved. The higher modes are strongly damped by this remaining portion of the core layer 6.

Figure 3:
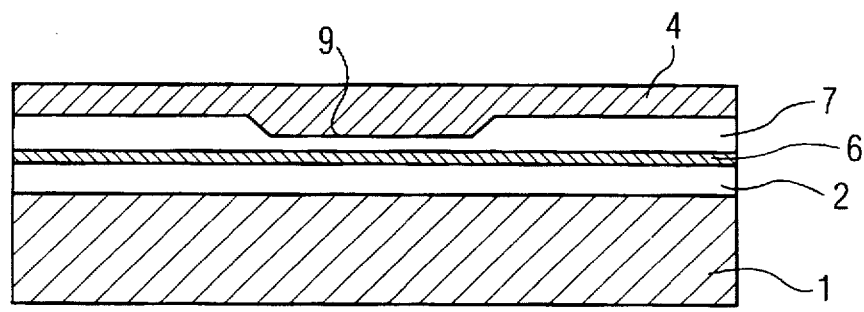
FIGS. 3 and 4, show further embodiments of a mode filter.
Figure 4:
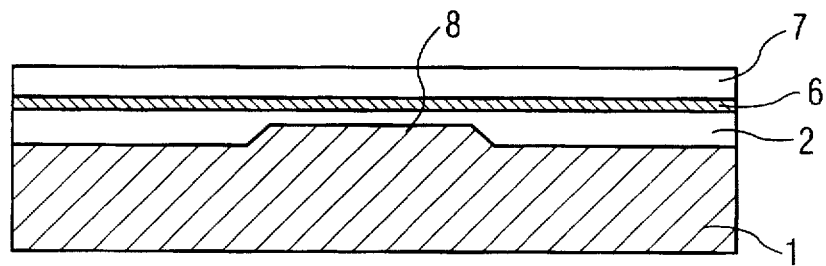

FIGS. 3 and 4, show exemplary embodiments of vertical mode filters. In the embodiment of FIG. 3, a lower buffer layer 2, a core layer 6, an upper buffer layer 7, and a cover layer 4 are disposed over the substrate 1. In the middle portion of the mode filter, the cover layer 4 is formed with a land, opposite of which the upper buffer layer 7 has a thinned portion 9. The thinned portion acts as a filter for the higher modes, if materials with the indexes of refraction noted in conjunction with the exemplary embodiment of FIGS. 1a and 1b are used for the layers 2, 4 and 7.

The exemplary embodiment of FIG. 4 differs from the exemplary embodiment of FIG. 3 in that the lower buffer layer 2 in the middle portion is made thinner by providing a land 8 on the substrate 1. Thus in this exemplary embodiment, this thinned portion acts as a filter for the higher modes.

We claim:

1. A device for preventing the propagation of undesired modes in an integrated optical wave guide, in which, adjacent a medium carrying the modes, a radiation-absorbing layer is located which has an index of refraction which is at least equal to the index of refraction of the medium carrying the modes, said device comprising
 a flat substrate (1);
 first and second buffer layers (2, 7), said first buffer layer (2) being located on said substrate (1);
 a wave guide core (3) forming said medium carrying the modes, located between said first and second buffer layers (2, 7), and comprising a generally flat core layer (6);
 at least one of said buffer layers, on at least one side of the wave guide core (3) being formed with a trench-like indentation (5), which indentation is filled with an absorbent optical material, or a material which has a higher index of refraction than that of the buffer layers;
 an absorbent layer (4) on said second buffer layer (7) and having a higher index of refraction than said buffer layers (2, 7); and
 wherein one of the buffer layers is provided with a thinned portion (9) which functions as a filter for higher modes being transmitted through the wave guide core (3).

2. The device of claim 1, wherein the flat substrate (1) has a land-like raised portion (8), and said first buffer layer (2) is thinned in the region opposite said raised portion (8).

3. The device of claim 1, wherein said absorbent layer (4) is formed with a land-like projecting portion, and said second buffer layer (7) is thinned in the region opposite said projecting portion.

* * * * *